US012659843B2

(12) United States Patent (10) Patent No.: US 12,659,843 B2
Yue et al. (45) Date of Patent: Jun. 16, 2026

(54) METHODS AND APPARATUSES FOR ACCESS CONTROL OF A SMALL SIZE AND INFREQUENT DATA TRANSMISSION

(71) Applicant: Lenovo (Beijing) Ltd., Beijing (CN)

(72) Inventors: Ran Yue, Haidian District (CN); Jing Han, Chaoyang District (CN); Haiming Wang, Xicheng District (CN); Jie Shi, Haidian District (CN); Lianhai Wu, Chaoyang (CN)

(73) Assignee: Lenovo (Beijing) Ltd., Beijing (CN)

( * ) Notice: Subject to any disclaimer, the term of this patent is extended or adjusted under 35 U.S.C. 154(b) by 413 days.

(21) Appl. No.: 18/003,956

(22) PCT Filed: Jul. 3, 2020

(86) PCT No.: PCT/CN2020/100224
§ 371 (c)(1),
(2) Date: Dec. 30, 2022

(87) PCT Pub. No.: WO2022/000488
PCT Pub. Date: Jan. 6, 2022

(65) Prior Publication Data
US 2023/0262586 A1 Aug. 17, 2023

(51) Int. Cl.
*H04W 48/16* (2009.01)
*H04W 48/14* (2009.01)
*H04W 76/20* (2018.01)
(52) U.S. Cl.
CPC ........... *H04W 48/16* (2013.01); *H04W 48/14* (2013.01); *H04W 76/20* (2018.02)

(58) Field of Classification Search
None
See application file for complete search history.

(56) References Cited

U.S. PATENT DOCUMENTS 11,665,625 B2 * 5/2023 Lee ...................... H04W 48/12
370/329
12,167,317 B2 * 12/2024 Tseng ................... H04W 48/06
(Continued)

FOREIGN PATENT DOCUMENTS

CN 110583051 A 12/2019
CN 111096041 A 5/2020
(Continued)

OTHER PUBLICATIONS

2022579920 , "Foreign Office Action", JP Application No. 2022579920, Apr. 6, 2024, 37 pages.
(Continued)

*Primary Examiner* — Gregory B Sefcheck
*Assistant Examiner* — Benjamin Peter Welte
(74) *Attorney, Agent, or Firm* — FIG. 1 Patents

(57) ABSTRACT

Embodiments of the present disclosure relate to methods and apparatuses for access control of a small size and infrequent data transmission. According to an embodiment of the present disclosure, a method includes: receiving access control configuration information; and performing an access control of a user equipment (UE) based on the access control configuration information, wherein the UE is configured with a pre-configured uplink (UL) resource, and the UE supports a small size and infrequent data transmission in radio resource control (RRC) inactive state or RRC idle state.

20 Claims, 3 Drawing Sheets

(56) References Cited

U.S. PATENT DOCUMENTS

| | | | | |
|---|---|---|---|---|
| 2018/0295556 | A1 | 10/2018 | Baek et al. | |
| 2019/0159108 | A1 | 5/2019 | Lee et al. | |
| 2020/0374966 | A1* | 11/2020 | Chang | H04W 74/0833 |
| 2021/0274525 | A1* | 9/2021 | Wei | H04W 76/27 |
| 2021/0315049 | A1* | 10/2021 | Wei | H04W 76/27 |
| 2022/0303883 | A1* | 9/2022 | Gao | H04W 48/16 |
| 2023/0120096 | A1* | 4/2023 | Kim | H04W 48/20 |
| | | | | 370/329 |
| 2023/0300901 | A1* | 9/2023 | Höglund | H04W 72/1268 |
| | | | | 370/329 |
| 2024/0056949 | A1* | 2/2024 | Hong | H04W 76/25 |

FOREIGN PATENT DOCUMENTS

| | | |
|---|---|---|
| CN | 111132328 A | 5/2020 |
| CN | 111294928 A | 6/2020 |
| WO | 2018236196 A1 | 12/2018 |
| WO | 2020065620 A1 | 4/2020 |
| WO | 2020067749 A1 | 4/2020 |
| WO | 2020087280 A1 | 5/2020 |

OTHER PUBLICATIONS

Huawei , et al., "Uplink transmission in dedicated pre-configured resource", 3GPP TSG-RAN WG2 Meeting #104, R2-1816401, Spokane, USA, Nov. 2018, 5 pages.

2022-579920 , "Foreign Notice of Acceptance", JP Application No. 2022-579920, Oct. 4, 2024, 8 pages.

Document Rapporteur (Blackberry) , "RAN2 agreements for Rel-16 additional enhancements for NB-IoT and MTC", 3GPP TSG-RAN WG2 Meeting #110-e, R2-2004466, online, Jun. 2020, 50 pages.

"Non-Access-Stratum (NAS) protocol for 5G System (5GS): Stage 3", 3rd Generation Partnership Project, Technical Specification Group Core Network and Terminals, 3GPP TS 24.501 V17.4.1, 3GPP Organizational Partners, Valbonne, France [retrieved Feb. 2, 2022]. Retrieved from the Internet <http://www.3gpp.org>., Sep. 2021, 863 pages.

20943264.0 , "Extended European Search Report", European Application No. 20943264.0, Feb. 27, 2024, 14 pages.

CATT , et al., "Update to UAC test case 11.3.4", 3GPP TSG-RAN5 Meeting #87-e, R5-202671, Online [retrieved Dec. 29, 2022]. Retrieved from the Internet <https://www.3gpp.org/ftp/TSG_RAN/ WG5_Test_ex-T1/TSGR5_87_Electronic/Inbox>., May 2020, 11 Pages.

PCT/CN2020/100224 , "International Preliminary Report on Patentability", PCT Application No. PCT/CN2020/100224, Jan. 12, 2023, 6 pages.

PCT/CN2020/100224 , "International Search Report and Written Opinion", US Application No. PCT/CN2020/100224, Apr. 1, 2021, 7 pages.

"Foreign Office Action", CN Application No. 202080102711.3, Feb. 28, 2025, 17 pages.

"Non-Access-Stratum (NAS) protocol for 5G System (5GS); Stage 3 (Release 16)", 3rd Generation Partnership Project; Technical Specification Group Core Network and Terminals; 3GPP TS 24.501 V16.4.1 (Mar. 2020), Mar. 2020, 666 pages.

Nokia, et al., "Access control for UE triggered V2X policy provisioning procedure", 3GPP TSG-CT WG1 Meeting #121, C1-198635, Reno (NV), USA, Nov. 11-15, 2019. [Retrieved from the Internet] <https://www.3gpp.org/ftp/tsg_ct/WG1_mm-cc-sm_ex-CN1/TSGC1_ 121_Reno/Docs>, Nov. 2019, 19 pages.

"Foreign Office Action", CN Application No. 202080102711.3, Aug. 22, 2025, 16 pages.

* cited by examiner transmitting an indicator, the indicator represents a support of receiving a small size and infrequent data transmission from a UE and transmitting another small size and infrequent data transmission to the UE

301 transmitting access control configuration information

302

405 400

PROCESSOR

NON-TRANSITORY COMPUTER-READABLE MEMORY

RECEIVER

TRANSMITTER 407 401 403

METHODS AND APPARATUSES FOR ACCESS CONTROL OF A SMALL SIZE AND INFREQUENT DATA TRANSMISSION

TECHNICAL FIELD

The present application generally relates to wireless communication technology, and especially to methods and apparatuses for access control of a small size and infrequent data transmission.

BACKGROUND

In 3GPP (3rd Generation Partnership Project) 5G system, a small size and infrequent data transmission is introduced for several use cases. For example, according to an agreement of 3GPP TSG RAN Meeting #86, a small size and infrequent data transmission can be used for smartphone applications including a traffic from instant messaging services or used for non-smartphone applications including a traffic from wearables. A small size and infrequent data transmission may also be named as a small data packet or a small data transmission.

In general, any device that has intermittent small data transmissions in radio resource control (RRC) inactive state or RRC idle state will benefit from enabling small data transmission in RRC inactive state (i.e., RRC INACTIVE state) or RRC idle state (i.e., RRC IDLE state). However, signaling overhead from a user equipment (UE) in RRC INACTIVE state or RRC IDLE state for small data transmissions is a general problem and will become a critical issue with more UEs not only for network performance and efficiency but also for the UE battery performance.

3GPP 5G networks are expected to increase network throughput, coverage, and robustness and reduce latency and power consumption. With the development of 3GPP 5G networks, various aspects need to be studied and developed to perfect the 5G technology.

SUMMARY

One object of embodiments of the present disclosure is to provide novel mechanisms for access control of a small size and infrequent data transmission of a user equipment (UE).

Some embodiments of the present application provide a method, which may be performed by a UE. The method includes: receiving access control configuration information; and performing an access control of a UE based on the access control configuration information, wherein the UE is configured with pre-configured uplink (UL) resource(s), and the UE is configured to support a small size and infrequent data transmission in one of RRC INACTIVE state and RRC IDLE state.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a method, which may be performed by a network or a base station (BS). The method includes: transmitting an indicator, the indicator represents a support of receiving a small size and infrequent data transmission from a UE and transmitting another small size and infrequent data transmission to the UE, wherein the UE is in one of RRC INACTIVE state and RRC IDLE state, and the UE is configured with pre-configured UL resource(s); and transmitting access control configuration information.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a network or a BS.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
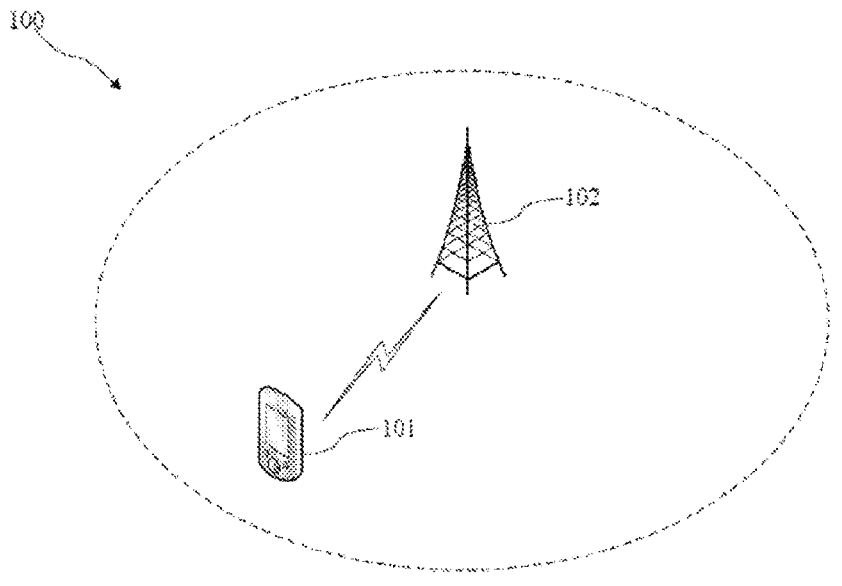
FIG. 1 illustrates a wireless communication system according to some embodiments of the present application.

FIG. 1 illustrates a wireless communication system 100 according to some embodiments of the present application.

Referring to FIG. 1, the wireless communication system 100 may include a UE 101 and a BS 102. Although a specific number of UE 101 and BS 102 are depicted in FIG. 1, it is contemplated that additional UEs 101 and BSs 102 may be available in the wireless communication system 100.

A BS 102 may be distributed over a geographic region, and may communicate with a core network (CN) node. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s) 102.

A UE 101 may directly communicate with the BS 102 via uplink communication signals. The UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In some embodiments of the present application, a UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, industrial Internet-of-Things (IIoT) devices, or the like.

According to some embodiments of the present application, a UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In addition, in some embodiments of the present application, a UE 101 may include, for example, but is not limited to, wearable devices, such as smart watches, fitness bands, optical head-mounted displays, or the like.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE 101 transmit data on the UL using a single-carrier frequency division multiple access (SC-FDMA) or OFDM scheme. More generally, however, the wireless communication system 100 may implement some other open or proprietary communication protocols, for example, WiMAX, WiFi, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with UE 101 using the 3GPP 5G protocols.

In 3GPP 5G new radio (NR), unified access control (UAC) is introduced. In particular, UAC supports all services, and maps different applications, services, voice calls, users with different priorities, etc. to the category, and the network side controls the access of the UE based on the category.

In 3GPP TS 38.331, the UAC is specified as follows:

5.3.14.2 Initiation

Upon initiation of the procedure, the UE shall:

---

1> if timer T390 is running for the Access Category:
    2> consider the access attempt as barred;
1> else if timer T302 is running and the Access Category is neither '2' nor '0':
    2> consider the access attempt as barred;
1> else:
    2> if the Access Category is '0':
        3> consider the access attempt as allowed;
    2> else:
        3> if SIB1 includes uac-BarringPerPLMN-List and the
            uac-BarringPerPLMN-List contains an UAC-BarringPerPLMN entry with
            the plmn-IdentityIndex corresponding to the PLMN selected by upper
            layers (see TS 24.501 [23]):
            4> select the UAC-BarringPerPLMN entry with the plmn-IdentityIndex
                corresponding to the PLMN selected by upper layers;
            4> in the remainder of this procedure, use the selected
                UAC-BarringPerPLMN entry (i.e. presence or absence of access barring
                parameters in this entry) irrespective of the uac-BarringForCommon
                included in SIB1;
        3> else if SIB1 includes uac-BarringForCommon:
            4> in the remainder of this procedure use the uac-BarringForCommon (i.e.
                presence or absence of these parameters) included in SIB1;
        3> else:
            4> consider the access attempt as allowed;
        3> if uac-BarringForCommon is applicable or the uac-ACBarringListType
            indicates that uac-ExplicitACBarringList is used:

-continued

>
> 4> if the corresponding UAC-BarringPerCatList contains a
>     UAC-BarringPerCat entry corresponding to the Access Category:
>     5> select the UAC-BarringPerCat entry;
>     5> if the uac-BarringInfoSetList contains a UAC-BarringInfoSet entry
>         corresponding to the selected uac-barringInfoSetIndex in the
>         UAC-BarringPerCat:
>         6> select the UAC-BarringInfoSet entry;
>         6> perform access barring check for the Access Category as specified
>             in 5.3.14.5, using the selected UAC-BarringInfoSet as "UAC
>             barring parameter";
>     5> else:
>         6> consider the access attempt as allowed;
> 4> else:
>     5> consider the access attempt as allowed;
> 3> else if the uac-ACBarringListType indicates that
>     uac-ImplicitACBarringList is used:
>     4> select the uac-BarringInfoSetIndex corresponding to the Access
>         Category in the uac-ImplicitACBarringList;
>     4> if the uac-BarringInfoSetList contains the UAC-BarringInfoSet entry
>         corresponding to the selected uac-BarringInfoSetIndex:
>         5> select the UAC-BarringInfoSet entry;
>         5> perform access barring check for the Access Category as specified in
>             5.3.14.5, using the selected UAC-BarringInfoSet as "UAC barring
>             parameter";
>     4> else:
>         5> consider the access attempt as allowed;
> 3> else:
>     4> consider the access attempt as allowed;
> 1> if the access barring check was requested by upper layers:
>     2> if the access attempt is considered as barred:
>         3> if timer T302 is running:
>             4> if timer T390 is running for Access Category '2':
>                 5> inform the upper layer that access barring is applicable for all access
>                     categories except categories '0', upon which the procedure ends;
>             4> else
>                 5> inform the upper layer that access barring is applicable for all access
>                     categories except categories '0' and '2', upon which the procedure
>                     ends;
>         3> else:
>             4> inform upper layers that the access attempt for the Access Category is
>                 barred, upon which the procedure ends;
>     2> else:
>         3> inform upper layers that the access attempt for the Access Category is
>             allowed, upon which the procedure ends;
> 1> else:
>     2> the procedure ends.

5.3.14.5 Access Barring Check
The UE shall:

> 1> if one or more Access Identities are indicated according to TS 24.501 [23], and
> 1> if for at least one of these Access Identities the corresponding bit in the
>     uac-BarringForAccessIdentity contained in "UAC barring parameter" is set to
>     zero:
>     2> consider the access attempt as allowed;
> 1> else:
>     2> draw a random number 'rand' uniformly distributed in the range: $0 \leq$ rand $< 1$;
>     2> if 'rand' is lower than the value indicated by uac-BarringFactor included in
>         "UAC barring parameter":
>         3> consider the access attempt as allowed;
>     2> else:
>         3> consider the access attempt as barred;
> 1> if the access attempt is considered as barred:
>     2> draw a random number 'rand' that is uniformly distributed in the range $0 \leq$
>         rand $< 1$;
>     2> start timer T390 for the Access Category with the timer value calculated as
>         follows, using the uac-BarringTime included in "AC barring parameter":
>         T390 = (0.7+0.6 * rand) * uac-BarringTime The AI and AC are defined in 3GPP TS 24.501.

The following Table 4.5.2.1 lists the AIs.

TABLE 4.5.2.1

| Access Identity number | UE configuration |
|---|---|
| 0 | UE is not configured with any parameters from this table |
| 1 (NOTE 1) | UE is configured for multimedia priority service (MPS). |
| 2 (NOTE 2) | UE is configured for mission critical service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:

Access identity 1 is valid when:

TABLE 4.5.2.1-continued

| Access Identity number | UE configuration |
|---|---|
| | the USIM file EFUAC_AIC indicates the UE is configured for access identity 1 and the RPLMN is the HPLMN (if the EHPLMN list is not present or is empty) or EHPLMN (if the EHPLMN list is present), or a visited PLMN of the home country (see the definition of home country in 3GPP TS 24.301 [15]); or the UE receives the 5GS network feature support IE with the MPS indicator bit set to "Access identity 1 valid in RPLMN or equivalent PLMN" from the RPLMN as described in subclause 5.5.1.2.4 and subclause 5.5.1.3.4. |

NOTE 2:

Access identity 2 is used by UEs configured for MCS and is valid when:

the USIM file EFUAC_AIC indicates the UE is configured for access identity 2 and the RPLMN is the HPLMN (if the EHPLMN list is not present or is empty) or EHPLMN (if the EHPLMN list is present), or a visited PLMN of the home country (see 3GPP TS 23.122 [5]); or
the UE receives the 5GS network feature support IE with the MCS indicator bit set to "Access identity 2 valid in RPLMN or equivalent PLMN" from the RPLMN as described in subclause 5.5.1.2.4 and subclause 5.5.1.3.4.

NOTE 3:

Access identities 11 and 15 are valid in HPLMN (if the EHPLMN list is not present or is empty) or EHPLMN (if the EHPLMN list is present). Access Identities 12, 13 and 14 are valid in HPLMN and visited PLMNs of home country only (see the definition of home country in 3GPP TS 24.301 [15]).

The following Table 4.5.2.2 is a mapping table for ACs.

TABLE 4.5.2.2

| Rule # | Type of access attempt | Requirements to be met | Access Category |
|---|---|---|---|
| 1 | Response to paging or NOTIFICATION over non-3GPP access; 5GMM connection management procedure initiated for the purpose of transporting an LPP message | Access attempt is for MT access | 0 (=MT_acc) |
| 2 | Emergency | UE is attempting access for an emergency session (NOTE 1, NOTE 2) | 2 (=emergency) |
| 3 | Access attempt for operator-defined access category | UE stores operator-defined access category definitions valid in the current PLMN as specified in subclause 4.5.3, and access attempt is matching criteria of an operator-defined access category definition | 32-63 (=based on operator classification) |
| 4 | Access attempt for delay tolerant service | (a) UE is configured for on-access stratum (NAS) signalling low priority or UE supporting S1 mode is configured for EAB (see the "ExtendedAccessBarring" leaf of NAS configuration MO in 3GPP TS 24.368 [17] or 3GPP TS 31.102 [22]) where "EAB override" does not apply, and (b). the UE received one of the categories a, b or c as part of the parameters for unified access control in the broadcast system information, and the UE is a member of the broadcasted category in the selected PLMN or RPLMN/equivalent PLMN (NOTE 3, NOTE 5, NOTE 6, NOTE 7, NOTE 8) | 1 (=delay tolerant) |
| 5 | MO MMTel voice call | Access attempt is for MO MMTel voice call or for NAS signalling connection recovery during ongoing MO MMTel voice call (NOTE 2) | 4 (=MO MMTel voice) |
| 6 | MO MMTel video call | Access attempt is for MO MMTel video call or for NAS signalling connection recovery during ongoing MO MMTel video call (NOTE 2) | 5 (=MO MMTel video) |

TABLE 4.5.2.2-continued

| Rule # | Type of access attempt | Requirements to be met | Access Category |
|---|---|---|---|
| 7 | MO SMS over NAS or MO SMSoIP | Access attempt is for MO SMS over NAS (NOTE 4) or MO SMS over SMSoIP transfer or for NAS signalling connection recovery during ongoing MO SMS or SMSoIP transfer (NOTE 2) | 6 (=MO SMS and SMSoIP) |
| 8 | UE NAS initiated 5GMM specific procedures | Access attempt is for MO signalling | 3 (=MO_sig) |
| 9 | UE NAS initiated 5GMM connection management procedure or 5GMM NAS transport procedure | Access attempt is for MO data | 7 (=MO_data) |
| 10 | An uplink user data packet is to be sent for a packet data unit (PDU) session with suspended user-plane resources | No further requirement is to be met | 7 (=MO_data) |

NOTE 1:

This includes 5GMM specific procedures while the service is ongoing and 5GMM connection management procedures required to establish a PDU session with request type = "initial emergency request" or "existing emergency PDU session", or to re-establish user-plane resources for such a PDU session. This further includes the service request procedure initiated with a SERVICE REQUEST message with the Service type IE set to "emergency services fallback".<
NOTE 2:

Access for the purpose of NAS signalling connection recovery during an ongoing service, or for the purpose of NAS signalling connection establishment following fallback indication from lower layers during an ongoing service, is mapped to the access category of the ongoing service in order to derive an RRC establishment cause, but barring checks will be skipped for this access attempt.
NOTE 3:

If the UE selects a new PLMN, then the selected PLMN is used to check the membership; otherwise the UE uses the RLPMN or a PLMN equivalent to the RPLMN.
NOTE 4:

This includes the 5GMM connection management procedures triggered by the UE-initiated NAS transport procedure for transporting the MO SMS.
NOTE 5:

The UE configured for NAS signalling low priority is not supported in this release of specification. If a UE supporting both S1 mode and N1 mode is configured for NAS signalling low priority in S1 mode as specified in 3GPP TS 24.368 [17] or 3GPP TS 31.102 [22], the UE shall ignore the configuration for NAS signalling low priority when in N1 mode.
NOTE 6:

If the access category applicable for the access attempt is 1, then the UE shall additionally determine a second access category from the range 3 to 7. If more than one access category matches, the access category of the lowest rule number shall be chosen. The UE shall use the second access category only to derive an RRC establishment cause for the access attempt.
NOTE 7:

"EAB override" does not apply, if the UE is not configured to allow overriding EAB (see the "Override_ExtendedAccessBarring" leaf of NAS configuration MO in 3GPP TS 24.368 [17] or 3GPP TS 31.102 [22]), or if NAS has not received an indication from the upper layers to override EAB and the UE does not have a PDU session that was established with EAB override.
NOTE 8:

For the definition of categories a, b and c associated with access category 1, see 3GPP TS 22.261 [3]. The categories associated with access category 1 are distinct from the categories a, b and c associated with EAB (see 3GPP TS 22.011 [1A]).

In addition, the 3GPP TS 24.501 also describes a mapping between ACs/AIs and RRC establishment cause(s) in section 4.5.6.

Generally, a UE in RRC INACTIVE state should perform unified access control (UAC), when an uplink user data packet is to be sent for a packet data unit (PDU) session with suspended user-plane resources. The UAC is used to determine which access attempt should be allowed or not, in order to avoid congestion in the 3GPP 5G System. In other words, when congestion occurs, no sufficient resource is allocated and the access attempt is barred. When a higher layer (e.g., a non-access stratum (NAS) layer) of the UE detects that an uplink user data packet is to be sent for a PDU session with suspended user-plane resources, the UE will perform access barring checks based on the determined AI(s) and AC(s).

Based on the current principles, there is no difference for an access probability between following two types of UEs which are camped on the same cell:

(1) UE A in RRC INACTIVE state is configured with pre-configured UL resource(s) for a small data trans-mission. Meanwhile, a traffic #a arrives and the traffic #a is suitable as a small data transmission.

(2) UE B in RRC INACTIVE state is not configured with pre-configured UL resource(s). Meanwhile, a traffic #a, which is suitable as small data transmission, arrives.

Since the UAC result is determined from the view of available resources, the UE A should have higher access probability than the UE B in the above example. Otherwise, the pre-configured UL resource(s) could be wasted in some cases, especially when it is medium-to-heavy load case. Given the above, an issue of how to control access for a UE configured with the pre-configured UL resource(s), which enables a small data transmission, needs to be solved.

Embodiments of the present application implement an optimized access control procedure for a UE which is configured with the pre-configured UL resource(s) and enables a small data transmission. Embodiments of the present application avoid a waste of the pre-configured UL resource(s).

Some embodiments of the present application provide solutions of considering an access attempt as allowed, if a UE is configured with pre-configured UL resource(s) and if the access attempt is for a configured traffic and the traffic is allowed to be transmitted as a small data transmission on the pre-configured UL resource(s). For example, the traffic is represented by at least one of a configured PDU session, a configured data flow, a configured QoS flow, a configured data radio bearer (DRB), and a configured logical channel (LCH). For instance, if a small data transmission is triggered by a traffic allowed to be transmitted in pre-configured UL resource(s), the UE may select a specific value 'n' as the AC. Specific examples are described in the embodiments of FIG. 2.

Some embodiments of the present application provide a specific set of access control parameters for a small data transmission. The set of access control parameters may be broadcasted or RRC dedicatedly configured. When a UE is configured with pre-configured UL resource(s), different sets of access control parameters will be applied to the same traffic, which depends on whether the traffic is associated with the pre-configured UL resource(s) for a small data transmission or not.

Figure 2:
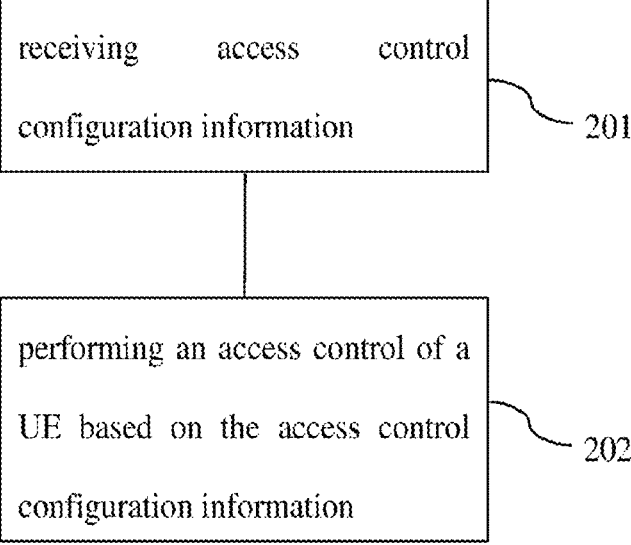
FIG. 2 is a flow diagram illustrating a method for performing an access control according to some embodiments of the present application.

FIG. 2 is a flow diagram illustrating a method for performing an access control according to some embodiments of the present application.

The method illustrated in FIG. 2 may be implemented by a UE (e.g., the UE 101 as illustrated and shown in FIG. 1). Although described with respect to a UE, it should be understood that other devices may be configured to perform a method similar to that of FIG. 2.

As shown in FIG. 2, in operation 201, a UE receives access control configuration information. The UE may be configured pre-configured uplink (UL) resource(s). The UE may support a small size and infrequent data transmission in one of RRC INACTIVE state and RRC IDLE state. For example, the UE is configured by a network or a BS to support a small size and infrequent data transmission in RRC INACTIVE state or RRC IDLE state. In operation 202, the UE performs an access control of a UE based on the access control configuration information received in operation 201.

The following text describes detailed embodiments of the present application. Details described in the embodiments as illustrated and shown in FIGS. 1, 3, and 4, especially, contents related to specific operations for access control of In some embodiments, the UE receives the access control configuration information through a broadcast message or through RRC signaling. In an embodiment, the UE receives the access control configuration information from a network side (for example, the BS 102 as illustrated and shown in FIG. 1). And then the UE may perform access control based on the access control configuration information.

The access control configuration information may include a set of access control parameters, which may include one or more barring information set entries. For example, the access control configuration information includes a set of unified access control (UAC) parameters, and the set of UAC parameters includes one or more of the following items:

(1) One or more access categories (ACs).

(2) One or more access identities (AIs).

(3) UAC barring parameter(s). The UAC barring parameter(s) may include an AC of a UE (e.g., the UE 101 as illustrated and shown in FIG. 1).

(4) Information regarding whether an access attempt of the UE is allowed for each AI of the UE. A UE may be of one or more AIs. The information regarding whether an access attempt of the UE is allowed for each AI of the UE includes an AI(s) of the UE.

(5) A probability of allowing the access attempt of the UE during an access barring check. The probability of allowing the access attempt of the UE may include 100%.

(6) A minimum time before a subsequent access attempt of the UE is to be performed after the access attempt of the UE is barred during the access barring check. The subsequent access attempt and the access attempt of the UE are for the same AC.

In some embodiments, the set of UAC parameters includes multiple barring information set entries, and each barring information set entry includes one or more of the above items.

In an embodiment, a new entry 'p' may be defined for a UE (e.g., the UE 101 as illustrated and shown in FIG. 1) which is configured with pre-configured UL resource(s) for a small data transmission. In particular, the entry 'p' may include the AC and the corresponding UAC barring parameter.

For example, the UAC barring parameter could include: uac-BarringForAccessIdentity, uac-BarringFactor, and uac-BarringTime, as shown in the Table 1 below.

TABLE 1

| uac-BarringForAccessIdentity |
| --- |
| Indicates whether access attempt is allowed for each Access Identity. The leftmost bit, bit 0 in the bit string corresponds to Access Identity 1, bit 1 in the bit string corresponds to Access Identity 2, bit 2 in the bit string corresponds to Access Identity 11, bit 3 in the bit string corresponds to Access Identity 12, bit 4 in the bit string corresponds to Access Identity 13, bit 5 in the bit string corresponds to Access Identity 14, and bit 6 in the bit string corresponds to Access Identity 15. Value 0 means that access attempt is allowed for the corresponding access identity. The IE can also include the bit 'm' for the new Access Identity 'x' described in embodiments of FIG. 2. |
| uac-BarringFactor |
| Represents the probability that access attempt would be allowed during access barring check. The configuration can include the probability p100 (100%). |
| uac-BarringTime |
| The minimum time in seconds before a new access attempt is to be performed after an access attempt was barred at access barring check for the same Access Category. | a small size and infrequent data transmission, are applicable for the embodiments as illustrated and shown in FIG. 2. Moreover, details described in the embodiments of FIG. 2 are applicable for all the embodiments of FIGS. 1, 3, and 4.

In an embodiment, if a UE is configured with pre-configured UL resource(s) for a small data transmission and if the entry 'p' corresponding to the AC is included in the system broadcast message, the UE may select the entry 'p' corresponding to the AC to perform the access barring check for the AC. In a further embodiment, a newly defined AC (e.g., 'n' or 'm' in following Examples 1-7) or a newly defined AI (e.g., 'x' in following Case A) can be included in a UAC barring parameter.

For instance, if the UE is configured with pre-configured UL resource(s) for a small data transmission and if a traffic arrives, but the traffic is not allowed to be transmitted on the pre-configured UL resource(s) as a small data transmission or the traffic is not configured to be allowed to be transmitted on the pre-configured UL resource(s) as a small data transmission, the UE may select an entry which is different from 'p' to perform the access barring check for the AC according to a system broadcast message.

In some embodiments, performing the access control of the UE comprises obtaining information related to the UE and determining whether to allow an access attempt of the UE based on the information related to the UE.

In an embodiment, the information related to the UE is included in the access control configuration information received in operation 201. In a further embodiment, the information related to the UE is indicated by a higher layer of the UE, e.g., a NAS layer. In another embodiment, the information related to the UE is selected or set by a lower layer of the UE, e.g., an access stratum (AS) layer.

The information related to the UE includes one or more of the following:

a) One or more ACs of the UE. The one or more ACs of the UE may be indicated by a higher layer of the UE or selected by a lower layer of the UE.

b) One or more AIs of the UE. The one or more AIs of the UE may be indicated by a higher layer of the UE or selected by a lower layer of the UE.

c) A bitmap of the AI of the UE. The bitmap of the AI of the UE may be received from a system broadcast message. For example, the UE 101 as illustrated and shown in FIG. 1 receives a bitmap of the AI of the UE 101 from the BS 102 as illustrated and shown in FIG. 1 via a system broadcast message.

d) A barring information set entry, e.g., a barring information set entry in a set of UAC parameters.

Specifically, in some embodiments, if the UE determines to allow an access attempt, the UE further determines whether the access attempt is associated with the small data transmission. If the UE determines that the access attempt is associated with the small data transmission, the UE transmits the small data transmission on the pre-configured UL resource(s). Otherwise, if the UE determines that the access attempt is not associated with the small data transmission, the UE will not transmit any transmission on the pre-configured UL resource(s).

In some embodiments, a UE in RRC INACTIVE or IDLE state directly allows an access attempt based on an AC of the UE. There may be the following cases:

Case 1:

If a UE is configured with pre-configured UL resource(s) for a small data transmission and if an uplink user data packet is to be sent for a PDU session with suspended user-plane resources, the UE considers an access attempt as allowed.

Case 2:

If a UE is configured with pre-configured UL resource(s) for a small data transmission, if the UE is configured with the PDU session(s), data flow(s), QoS flow(s), DRB(s), or LCH(s), which is allowed to be transmitted on the pre-configured UL resource(s) as a small data transmission, and if an access attempt is for the configured PDU session(s), data flow(s), QoS flow(s), DRB(s), or LCH(s), the UE considers the access attempt as allowed.

Case 3:

If a UE is configured with pre-configured UL resource(s) for a small data transmission, if the UE is configured with the PDU session(s), data flow(s), QoS flow(s), DRB(s), or LCH(s), which is allowed to be transmitted on the pre-configured UL resource(s) as a small data transmission, if an uplink user data packet is to be sent for a PDU session with suspended user-plane resources, and if an access attempt is for the configured PDU session(s), data flow(s), QoS flow(s), DRB(s), or LCH(s), the UE considers the access attempt as allowed.

Case 4:

Scenario 1:

If a UE is configured with pre-configured UL resource(s) for a small data transmission and if an uplink user data packet is to be sent for a PDU session with suspended user-plane resources, the UE further determines whether data can be completely transmitted by the current pre-configured UL resource(s).

Scenario 2:

If a UE is configured with pre-configured UL resource(s) for a small data transmission, if the UE is configured the PDU session(s), data flow(s), QoS flow(s), DRB(s), or LCH(s), which is allowed to be transmitted on the pre-configured UL resource(s) as a small data transmission, and if an access attempt is for the configured PDU session(s), data flow(s), QoS flow(s), DRB(s), or LCH(s), the UE further determines whether data can be completely transmitted by the current pre-configured UL resource(s).

Scenario 3:

If a UE is configured with pre-configured UL resource(s) for a small data transmission, if the UE is configured with the PDU session(s), data flow(s), QoS flow(s), DRB(s), or LCH(s), which is allowed to be transmitted on the pre-configured UL resource(s) as a small data transmission, if an uplink user data packet is to be sent for a PDU session with suspended user-plane resources, and if an access attempt is for the configured PDU session(s), QoS flow(s), DRB(s), or LCH(s), the UE further determines whether data can be completely transmitted by the current pre-configured UL resource(s).

Regarding the above Scenarios 1-3 of Case 4, after the determination, there may be the following sub-cases:

4.1. If the data can be completely transmitted by the current pre-configured UL resource(s), the UE considers an access attempt as allowed.

4.2. If the data cannot be completely transmitted by the current pre-configured UL resource(s), the UE considers the access attempt as not allowed.

4.3. If the data cannot be completely transmitted by the current pre-configured UL resource(s), the UE further determines, according to the configuration of the pre-configured resources, whether the size of data to be transmitted needs to be segmented to assemble into the current pre-configured resource(s) and whether the remaining size of the data can be assembled into the following pre-configured resources and whether the data(s)/packet(s) will be discarded because of expiration of a service data unit (SDU), data, or a packet. If the UE determines that the size of data to be transmitted needs to be segmented to assemble into the current pre-configured resource(s), the remaining size of the data can be assembled into the following pre-configured resources, and data(s) or packet(s) will not be discarded because of expiration of a SDU, data, or a packet, the UE considers the access attempt as allowed.

In particular, in an embodiment, during determining whether to allow the access attempt, the UE may perform the following operation:

(1) If one AC of the UE is obtained and the one AC represents an access configuration associated with the small data transmission, the UE may allow the access attempt. An access configuration may also be named as a piece of access configuration information. Specific examples of such operation are described in the following Examples 1-5.

In a further embodiment, during determining whether to allow the access attempt, the UE may perform the following operations:

(1) If one AC and/or one or more AIs of the UE are obtained, the UE may set a predefined value as a value of the one AC. The predefined value is related to an access configuration.

(2) Then, the UE further determines whether the value of the one AC is equal to the predefined value.

(3) Option 1: if the UE determines that the value of the one AC is equal to the predefined value, the UE allows the access attempt. Specific examples of such operations are described in the following Examples 6 and 7.

(4) Option 2: if one AC and/or one or more AIs of the UE are obtained, the UE may set a predefined value as a value of the AC. If the UE is configured with pre-configured UL resource(s) for a small data transmission and if the entry 'p' corresponding to the AC is included in a system broadcast message, the UE may select the entry 'p' to perform the access barring check for the AC.

In another embodiment, during determining whether to allow the access attempt, the UE may perform the following operations:

(3) If the UE determines that the data to be transmitted by the UE cannot be completely transmitted on the pre-configured UL resource(s), the UE further determines whether the data to be transmitted by the UE will be discarded.

(4) If the UE determines that the data to be transmitted by the UE will not be discarded, the UE allows the access attempt.

For example, an access configuration associated with a small data transmission may include one or more of the following configuration information, and specific examples of such operation are described in Examples 1-7:

(1) The UE is configured to transmit a small data transmission on the pre-configured UL resource(s).

(2) The UE is configured with a traffic that is allowed to be transmitted as a small data transmission on the pre-configured UL resource(s). The traffic is represented by at least one of a PDU session, a data flow, a DRB, a LCH, and a QoS flow.

For Example 1, the above procedures can be realized by a 3GPP specification document as:

(1) Defining an Access Category 'n' for a small data transmission on pre-configured UL resource(s) when a UE is in the RRC INACTIVE or IDLE state; and/or (2) Defining a new Access Category 'm' for a traffic, which is allowed to be transmitted on the pre-configured UL resource(s) as a small data transmission, when the UE is in the RRC INACTIVE or IDLE state. The traffic can be the configured PDU session (s), data flow(s), QoS flow(s), DRB(s), or LCH(s).

For instance, the related 3GPP specification document may define operations of a UE in Example 1 as below:

```
Upon (AS layer) initiation of the (Unified Access Control) procedure, the UE shall:
    1> if timer T390 is running for the Access Category:
        2> consider the access attempt as barred;
    1> else if timer T302 is running and the Access Category is neither '2' nor '0':
        2> consider the access attempt as barred;
    1> else:
        2> if the Access Category is '0' or 'n' or 'm':
            3>  consider the access attempt as allowed;
            ......
```

(1) If one AC of the UE is obtained, and the AC represents an access configuration associated with the small data transmission, the UE determines whether data to be transmitted by the UE can be completely transmitted on the pre-configured UL resource(s).

(2) If the UE determines that the data to be transmitted by the UE can be completely transmitted on the pre-configured UL resource(s), the UE allows the access attempt of the UE.

For Example 2, the above procedure can be realized by a 3GPP specification document as:

Defining a new Access Category 'm' for the traffic which is allowed to transmit on the pre-configured UL resource(s) as a small data transmission when the UE is in the RRC INACTIVE or IDLE state. The traffic can be the configured PDU session (s), data flow(s), QoS flow(s), DRB(s), or LCH(s).

For instance, the related 3GPP specification document may define operations of a UE in Example 2 as below:

```
Upon (AS layer) initiation of the (Unified Access Control) procedure, the UE shall:
    1> if timer T390 is running for the Access Category:
        2> consider the access attempt as barred;
    1> else if timer T302 is running and the Access Category is neither '2' nor '0':
        2> consider the access attempt as barred;
    1> else:
        2> if the Access Category is '0':
            3>  consider the access attempt as allowed;
        2> else if the Access Category is 'm' or the UE is configured with the
            pre-configured UL resources for a small data transmission and if the UE
```

-continued

---
```
        is in the RRC INACTIVE or IDLE state:
    3>   consider the access attempt as allowed;
                        ......
```
---

For Example 3, the above procedures can be realized by
a 3GPP specification document as:

Defining an Access Category 'n' for the small data trans-
        mission on pre-configured UL resource(s) when the UE
        is in the RRC INACTIVE or IDLE state.

For instance, the related 3GPP specification document
may define operations of a UE in Example 3 as below:

---
```
Upon (AS layer) initiation of the (Unified Access Control) procedure, the UE shall:
    1> if timer T390 is running for the Access Category:
        2> consider the access attempt as barred;
    1> else if timer T302 is running and the Access Category is neither '2' nor '0':
        2> consider the access attempt as barred;
    1> else:
        2> if the Access Category is '0':
            3>   consider the access attempt as allowed;
        2> else if the Access Category is 'n' and the UE is in the RRC INACTIVE or
           IDLE state:
            3>   consider the access attempt as allowed;
                        ......
```
---

For Example 4, a 3GPP specification document may
define operations of a UE as below:

---
```
Upon (AS layer) initiation of the (Unified Access Control) procedure, the UE shall:
    1> if timer T390 is running for the Access Category:
        2> consider the access attempt as barred;
    1> else if timer T302 is running and the Access Category is neither '2' nor '0':
        2> consider the access attempt as barred;
    1> else:
        2> if the Access Category is '0':
            3>   consider the access attempt as allowed;
        2> else if the UE is configured with the pre-configured UL resources for a
           small data transmission and the UE is in the RRC INACTIVE or IDLE
           state:
            3>   consider the access attempt as allowed;
                        ......
```
---

For Example 5, the above procedures can be realized by
a 3GPP specification document as:

Configuring a traffic DRB 'k' as allowed to be transmitted
        as a small data transmission on the pre-configured UL
        resource(s). Similarly, in other cases, 'k' may be con-
        figured as representing a data flow, a QoS flow, or a
        LCH.

For instance, the related 3GPP specification document
may define operations of a UE in Example 5 as below:

---
```
Upon (AS layer) initiation of the (Unified Access Control) procedure, the UE shall:
    1> if timer T390 is running for the Access Category:
        2> consider the access attempt as barred;
    1> else if timer T302 is running and the Access Category is neither '2' nor '0':
        2> consider the access attempt as barred;
    1> else:
        2> if the Access Category is '0':
            3>   consider the access attempt as allowed;
        2> else if the UE is configured with the pre-configured UL resources for a
           small data transmission and the new arrival data is for the configured
           DRB 'k' and the UE is in the RRC INACTIVE or IDLE state:
            3>   consider the access attempt as allowed;
                        ......
```
---

For Example 6, the above procedures can be realized by a 3GPP specification document as:

(optional) Defining an Access Category 'n' for the small data transmission on pre-configured UL resource(s) when the UE is in the RRC INACTIVE or IDLE state.

For instance, the related 3GPP specification document may define operations of a UE in Example 6 as below:

```
1> else if the resumption of the RRC connection is triggered by upper layers:
    2>  if the upper layers provide an Access Category '7' and one or more
    Access Identities and the Pre-configured UL resources for the small data
    transmission has been configured:
        3>  set/select 'n' as the Access Category;
            3>  perform the unified access control procedure as specified in
            5.3.14 using the Access Category and Access Identities provided by
            upper layers;
                4> if the access attempt is barred, the procedure ends;
                            ......
Upon (AS layer) initiation of the (Unified Access Control) procedure, the UE shall:
    1> if timer T390 is running for the Access Category:
        2> consider the access attempt as barred;
    1> else if timer T302 is running and the Access Category is neither '2' nor '0':
        2> consider the access attempt as barred;
    1> else:
        2> if the Access Category is 'n':
            3>  consider the access attempt as allowed;
                            ......
```

For Example 7, the above procedures can be realized by a 3GPP specification document as:

(optional) Defining a new Access Category 'm' for a traffic, which is allowed to be transmitted on the pre-configured UL resource(s) as a small data transmission, when the UE is in the RRC INACTIVE or IDLE state. The traffic can be the configured as PDU session(s), data flow(s), QoS flow(s), DRB(s), or LCH(s).

For instance, the related 3GPP specification document may define operations of a UE in Example 7 as below:

```
1> else if the resumption of the RRC connection is triggered by upper layers:
    2> if the upper layers provide an Access Category '7' and one or more
    Access Identities and the arriving data is allowed to transmitted on the
    UL pre-configured resources as the small data transmission:
        3>  set/select 'm' as the Access Category;
        3>   perform the unified access control procedure as specified in
        5.3.14 using the Access Category and Access Identities provided by
        upper layers;
                        ......
            4> if the access attempt is barred, the procedure ends;
Upon (AS layer) initiation of the (Unified Access Control) procedure, the UE shall:
    1> if timer T390 is running for the Access Category:
        2> consider the access attempt as barred;
    1> else if timer T302 is running and the Access Category is neither '2' nor '0':
        2> consider the access attempt as barred;
    1> else:
        2> if the Access Category is 'm':
            3>  consider the access attempt as allowed;
                        ......
```

In some further embodiments, a UE directly allows an access attempt based on an AI of the UE. There may be the following cases.

Case A

1. Defining a new Access Identity 'x' for a UE in RRC INACTIVE or IDLE state that is capable of transmitting or receiving a small data transmission.

2. The UE is configured with pre-configured UL resource(s) for a small data transmission.

3. The AI 'x' is indicated by a higher layer (e.g., a NAS layer). Alternatively, the AI 'x' is set or selected by a lower layer (e.g., an AS layer).

4. If all the above conditions 1-3 are satisfied, considering the access attempt as allowed.

Case B

1. Defining a new Access Identity 'x' for a UE in RRC INACTIVE or IDLE state that is capable of transmitting or receiving a small data transmission.

2. The UE is configured with pre-configured UL resource(s) for a small data transmission.

3. The AI 'x' is indicated by a higher layer (e.g., a NAS layer). Alternatively, the AI 'x' is set or selected by a lower layer (e.g., an AS layer).

4. If all the above conditions 1-3 are satisfied: if the data can be completely transmitted by the current pre-configured resource, considering the access attempt as allowed. Otherwise, if the data cannot be completely transmitted by the current pre-configured resource, considering the access attempt as not allowed.

Case C

1. Defining a new Access Identity 'x' for a UE in RRC INACTIVE or IDLE state that is capable of a small data transmission with pre-configured UL resource(s) for the small data transmission.

2. The AI 'x' is indicated by a higher layer (e.g., a NAS layer). Alternatively, the AI 'x' is set or selected by a lower layer (e.g., an AS layer).

3. The bitmap of AI 'x' is included in the network broadcast message.

4. If all the above conditions 1-3 are satisfied: if the corresponding bit of AI 'x' (which could be included in the uac-BarringForAccessIdentity contained in "UAC barring parameter") is set to zero, considering the access attempt as allowed. Otherwise, if the corresponding bit of AI 'x' is not set to zero, considering the access attempt as not allowed.

In some further embodiments, a UE directly allows an access attempt based on an AI and a traffic of the UE. There may be the following cases.

Case X

1. Defining a new Access Identity 'x' for the UE in RRC INACTIVE or IDLE state that is capable of small data transmission.
2. The UE is configured with pre-configured UL resource(s) for a small data transmission.
3. The UE is configured with a traffic of PDU session(s), data flow(s), QoS flow(s), DRB(s), or LCH(s) which is allowed to be transmitted on the pre-configured UL resource(s) as a small data transmission.
4. If the access attempt is for the configured traffic represented by PDU session(s), data flow(s), QoS flow(s), DRB(s), or LCH(s): the AI 'x' may be indicated by a higher layer; or the AI 'x' may be set or selected by a lower layer.
5. If all the above conditions 1-4 are satisfied, considering the access attempt as allowed.

Case Y

1. Defining a new Access Identity 'x' for the UE in RRC INACTIVE or IDLE state that is capable of small data transmission.
2. The UE is configured with pre-configured UL resource(s) for a small data transmission.
3. The UE is configured with a traffic of PDU session(s), data flow(s), QoS flow(s), DRB(s), or LCH(s) which is allowed to be transmitted on the pre-configured UL resource(s) as a small data transmission.
4. If the access attempt is for the configured traffic of PDU session(s), data flow(s), QoS flow(s), DRB(s), or LCH(s): the AI 'x' may be indicated by a higher layer; or the AI 'x' may be set or selected by a lower layer.
5. There may be the following sub-cases:
   5.1. If all the above conditions 1-4 are satisfied: if the corresponding bit of AI 'x' in the uac-BarringForAccessIdentity contained in "UAC barring parameter" is set to zero, considering the access attempt as allowed.
   5.2. If all the above conditions 1-4 are satisfied: if the data can be completely transmitted by the current pre-configured UL resource(s), considering the access attempt as allowed; otherwise, if the data cannot be completely transmitted by the current pre-configured UL resource(s), considering the access attempt as not allowed.
   5.3. If all the above conditions 1-3 are satisfied: if the corresponding bit of AI 'x' in the uac-BarringForAccessIdentity contained in "UAC barring parameter" is set to zero, and determining whether the data can be completely transmitted by the current pre-configured UL resource(s); if the data can be completely transmitted by the current pre-configured UL resource(s), considering the access attempt as allowed; otherwise, if the data cannot be completely transmitted by the current pre-configured UL resource(s), considering the access attempt as not allowed.

Referring back to FIG. 2, in an embodiment, during determining whether to allow the access attempt, if an AI of the UE is obtained and the AI of the UE represents an access identity 'x', the UE allows the access attempt of the UE. The access identity 'x' indicates that the UE is configured to transmit the small size and infrequent data transmission in one of the RRC inactive state and the RRC idle state. The access identity is indicated by a higher layer of the UE or selected by a lower layer of the UE. A bitmap of the access identity may be included in a broadcast message.

In a further embodiment, during determining whether to allow the access attempt, if an AI of the UE is obtained and the AI of the UE represents an access identity 'x', the UE determines whether the UE is configured with a traffic which is allowed to be transmitted as a small data transmission on the pre-configured UL resource; and if the UE determines that the UE is configured with the traffic, the UE allows the access attempt of the UE. If the UE determines that the UE is not configured with the traffic, the UE performs an access barring check according to a broadcast message received from the network or a BS. For instance, the traffic may be represented by one or more of a PDU session, a data flow, a QoS flow, a DRB, and a LCH.

In another embodiment, during determining whether to allow the access attempt, if an AI of the UE is obtained and the AI of the UE represents an access identity 'x', determining whether a bit in the access control configuration information is set to zero, wherein the bit corresponds to the AI of the UE. If the UE determines that the bit is set to zero, the UE further determines whether data to be transmitted by the UE can be completely transmitted on the pre-configured UL resource; if the UE determines that the data to be transmitted by the UE can be completely transmitted on the pre-configured UL resource, the UE allows the access attempt; if the UE determines that the data to be transmitted by the UE cannot be completely transmitted on the pre-configured UL resource, the UE further determines whether the data to be transmitted by the UE will be discarded; if the UE determines that the data to be transmitted by the UE will not be discarded, the UE allows the access attempt.

Figure 3:
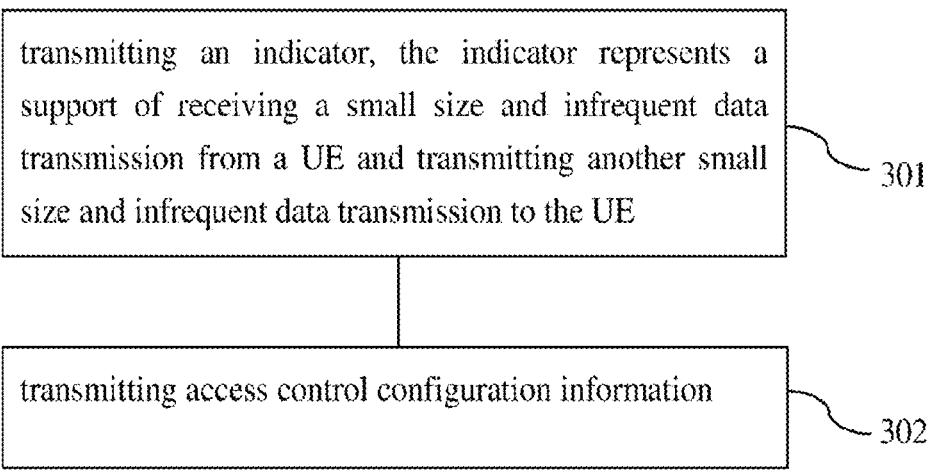
FIG. 3 is a flow diagram illustrating a method for transmitting access control configuration information according to some embodiments of the present application.

FIG. 3 is a flow diagram illustrating a method for transmitting access control configuration information according to some embodiments of the present application.

The method illustrated in FIG. 3 may be implemented by a network or a BS (e.g., the BS 102 as illustrated and shown in FIG. 1). Although described with respect to a network or a BS, it should be understood that other devices may be configured to perform a method similar to that of FIG. 3.

As shown in FIG. 3, in operation 301, a BS transmits an indicator, which represents a support of receiving a small data transmission from a UE (e.g., the UE 101 as illustrated and shown in FIG. 1) and transmitting the small data transmission to the UE. The UE may be configured pre-configured UL resource(s). The UE is configured to support a small data transmission in one of RRC INACTIVE state and RRC IDLE state. In operation 302, the BS transmits access control configuration information.

For example, the access control configuration information may be transmitted through a broadcast message or through RRC signaling. The access control configuration information may include a set of access control parameters, which may include one or more barring information set entries.

Figure 4:
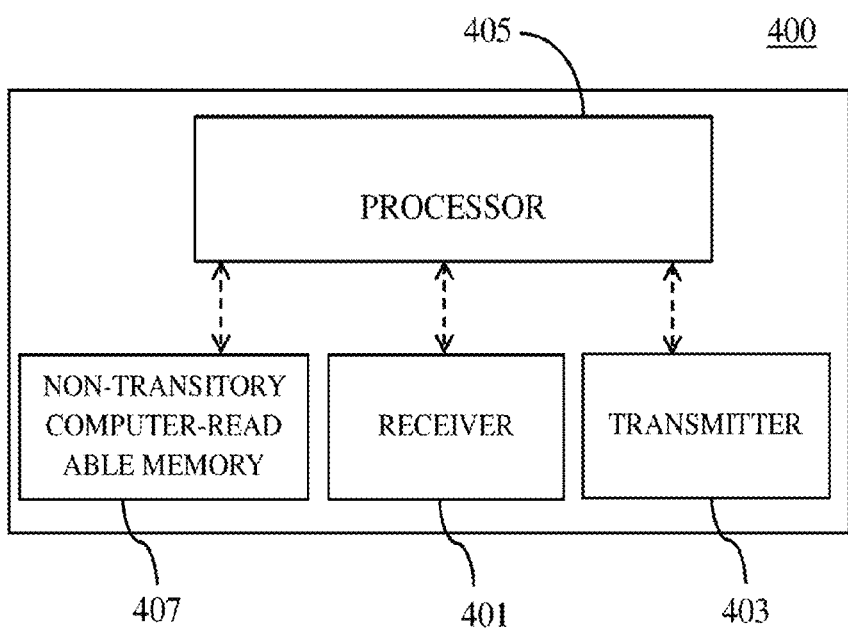
FIG. 4 illustrates an apparatus according to some embodiments of the present application.

All details described in the embodiments as illustrated and shown in FIGS. 1, 2, and 4, especially, contents related to specific operations for access control of a small data transmission, are applicable for the embodiments as illustrated and shown in FIG. 3. Moreover, all details described in the embodiments of FIG. 3 are applicable for all the embodiments of FIGS. 1, 2, and 4.

FIG. 4 illustrates an apparatus according to some embodiments of the present application. In some embodiments of the present disclosure, the apparatus 400 may be the UE 101 as illustrated and shown in FIG. 1 or other embodiments of the present application. In some other embodiments of the present disclosure, the apparatus 400 may be the BS 102 as illustrated and shown in FIG. 1 or other embodiments of the present application.

As shown in FIG. 4, the apparatus 400 may include a receiver 401, a transmitter 403, a processer 405, and a non-transitory computer-readable medium 407. The non-transitory computer-readable medium 407 has computer executable instructions stored therein. The processer 405 is configured to be coupled to the non-transitory computer readable medium 407, the receiver 401, and the transmitter 403. It is contemplated that the apparatus 400 may include more computer-readable mediums, receiver, transmitter and processors in some other embodiments of the present application according to practical requirements. In some embodiments of the present application, the receiver 401 and the transmitter 403 are integrated into a single device, such as a transceiver. In certain embodiments, the apparatus 400 may further include an input device, a memory, and/or other components.

In some embodiments of the present application, the non-transitory computer-readable medium 407 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:

at least one memory; and at least one processor coupled with the at least one memory and operable to cause the UE to:

receive access control configuration information comprising a set of unified access control (UAC) parameters, wherein the set of UAC parameters comprises one or more barring information set entries, and wherein the UE is configured with a pre-configured uplink (UL) resource and the UE supports a small data transmission on the pre-configured UL resource when the UE is in one or more of a radio resource control (RRC) inactive state or an RRC idle state;

select a barring information set entry in the set of UAC parameters based on the small data transmission being triggered by traffic allowed to be transmitted on the pre-configured UL resource; and perform an access control of the UE based on the access control configuration information and the selected barring information set entry, wherein to perform the access control, the at least one processor is operable to cause the UE to:

obtain, in an indication by a non-access stratum (NAS) layer, information related to the UE comprising one or more access categories (ACs) and one or more access identities (AIs) of the UE;

determine, based at least in part on obtaining, in the one or more ACs, an AC representing an access configuration associated with the small data transmission, whether data to be transmitted by the UE can be completely transmitted on the pre-configured UL resource;

allow, based at least in part on determining that the data to be transmitted by the UE can be completely transmitted on the pre-configured UL resource, an access attempt of the UE;

determine, based at least in part on determining that the data to be transmitted by the UE cannot be completely transmitted on the pre-configured UL resource, whether the data to be transmitted by the UE is to be discarded; and allow, based at least in part on determining that the data to be transmitted by the UE is not to be discarded, the access attempt of the UE.

2. The UE of claim 1, wherein the one or more barring information set entries comprise one or more of:

information regarding whether a first access attempt of the UE is allowed for each AI of the UE;

a probability of allowing the first access attempt of the UE during an access barring check; or a minimum time before a second access attempt of the UE is to be performed after the first access attempt of the UE is barred during an access barring check, wherein the second access attempt and the first access attempt are for a same AC.

3. The UE of claim 2, wherein the probability of allowing the first access attempt of the UE is one hundred percent.

4. The UE of claim 1, wherein the traffic is represented by one or more of a packet data unit (PDU) session, a data flow, a data radio bearer (DRB), a logical channel (LCH), or a quality of service (QoS) flow.

5. The UE of claim 1, wherein the at least one processor is operable to cause the UE to:

determine, based at least in part on determining to allow the access attempt of the UE, whether the access attempt is associated with the small data transmission;

transmit, based at least in part on determining that the access attempt is associated with the small data transmission, the small data transmission on the pre-configured UL resource; and not transmit, based at least in part on determining that the access attempt is not associated with the small data transmission, a transmission on the pre-configured UL resource.

6. The UE of claim 1, wherein to determine whether to allow the access attempt of the UE, the at least one processor is operable to cause the UE to:

obtain, in the one or more ACs, an AC representing an access configuration associated with the small data transmission; and allow the access attempt of the UE.

7. The UE of claim 1, wherein the at least one processor is operable to cause the UE to:

determine, based at least in part on obtaining an AI in the one or more AIs, whether a bit corresponding to the AI is set to zero in the access control configuration information; and allow, based at least in part on determining that the bit is set to zero, the access attempt of the UE.

8. A method performed by a user equipment (UE), the method comprising:

receiving access control configuration information comprising a set of unified access control (UAC) parameters, wherein the set of UAC parameters comprises one or more barring information set entries, and wherein the UE is configured with a pre-configured uplink (UL) resource and the UE supports a small data transmission on the pre-configured UL resource when the UE is in one or more of a radio resource control (RRC) inactive state or an RRC idle state;

selecting a barring information set entry in the set of UAC parameters based on the small data transmission being triggered by traffic allowed to be transmitted on the pre-configured UL resource; and performing an access control of the UE based on the access control configuration information and the selected barring information set entry, wherein performing the access control comprises:

obtaining, in an indication by a non-access stratum (NAS) layer, information related to the UE comprising one or more access categories (ACs) and one or more access identities (AIs) of the UE;

determining, based at least in part on obtaining, in the one or more ACs, an AC representing an access configuration associated with the small data transmission, whether data to be transmitted by the UE can be completely transmitted on the pre-configured UL resource;

allowing, based at least in part on determining that the data to be transmitted by the UE can be completely transmitted on the pre-configured UL resource, an access attempt of the UE;

determining, based at least in part on determining that the data to be transmitted by the UE cannot be completely transmitted on the pre-configured UL resource, whether the data to be transmitted by the UE is to be discarded; and allowing, based at least in part on determining that the data to be transmitted by the UE is not to be discarded, the access attempt of the UE.

9. The method of claim 8, wherein the one or more barring information set entries comprise one or more of:

information regarding whether a first access attempt of the UE is allowed for each AI of the UE;

a probability of allowing the first access attempt of the UE during an access barring check; or a minimum time before a second access attempt of the UE is to be performed after the first access attempt of the UE is barred during an access barring check, wherein the second access attempt and the first access attempt are for the same AC.

10. The method of claim 8, wherein the traffic is represented by one or more of a packet data unit (PDU) session, a data flow, a data radio bearer (DRB), a logical channel (LCH), or a quality of service (QoS) flow.

11. The method of claim 8, further comprising:

determining, based at least in part on determining to allow the access attempt of the UE, whether the access attempt is associated with the small data transmission;

transmitting, based at least in part on determining that the access attempt is associated with the small data transmission, the small data transmission on the pre-configured UL resource; and not transmitting, based at least in part on determining that the access attempt is not associated with the small data transmission, a transmission on the pre-configured UL resource.

12. A base station for wireless communication, comprising:

at least one memory; and at least one processor coupled with the at least one memory and operable to cause the base station to:

transmit an indicator, the indicator comprising an indication of a support of receiving a first small data transmission from a user equipment (UE) and transmitting a second small data transmission to the UE, wherein the first small data transmission is triggered by traffic allowed to be transmitted on a pre-configured uplink (UL) resource, and wherein the UE is in one of a radio resource control (RRC) inactive state or a RRC idle state; and transmit, to the UE, access control configuration information comprising a set of unified access control (UAC) parameters, wherein the set of UAC parameters comprises one or more barring information set entries, a barring information set entry including one or more access categories (ACs) of the UE and one or more access identities (AIs) of the UE, the one or more ACs including an AC representing an access configuration associated with the small data transmission, wherein an access attempt of the UE is allowed based at least in part on a determination that data to be transmitted by the UE can be completely transmitted on the pre-configured UL resource, wherein whether the data can be completely transmitted on the pre-configured UL resource is based at least in part on the AC, and wherein the access attempt of the UE is allowed based at least in part on a determination that the data to be transmitted by the UE is not to be discarded, wherein whether the data is to be discarded is based at least in part on the data to be transmitted by the UE not being able to be completely transmitted on the pre-configured UL resource.

13. The base station of claim 12, wherein the one or more barring information set entries comprise one or more of:

information regarding whether the access attempt of the UE is allowed for each AI of the UE;

a probability of allowing the access attempt of the UE during an access barring check; or a minimum time before a second access attempt of the UE is to be performed after the access attempt of the UE is barred during an access barring check, wherein the second access attempt and the access attempt are for a same AC.

14. The base station of claim 13, wherein the probability of allowing the access attempt of the UE is one hundred percent.

15. The base station of claim 12, wherein traffic is represented by one or more of a packet data unit (PDU) session, a data flow, a data radio bearer (DRB), a logical channel (LCH), or a quality of service (QoS) flow.

16. The base station of claim 12, wherein the at least one processor is further configured to cause the base station to:

determine, based at least in part on determining to allow the access attempt of the UE, whether the access attempt is associated with the first small data transmission;

transmit, based at least in part on determining that the access attempt is associated with the first small data transmission, the first small data transmission on the pre-configured UL resource; and not transmit, based at least in part on determining that the access attempt is not associated with the first small data transmission, a transmission on the pre-configured UL resource.

17. A method performed by a base station, the method comprising:

transmitting an indicator, the indicator comprising an indication of a support of receiving a first small data transmission from a user equipment (UE) and transmitting a second small data transmission to the UE, wherein the first small data transmission is triggered by traffic allowed to be transmitted on a pre-configured uplink (UL) resource, and wherein the UE is in one of a radio resource control (RRC) inactive state or a RRC idle state; and transmitting, to the UE, access control configuration information comprising a set of unified access control (UAC) parameters, wherein the set of UAC parameters comprises one or more barring information set entries, a barring information set entry including one or more access categories (ACs) of the UE and one or more access identities (AI) of the UE, the one or more ACs including an AC representing an access configuration associated with the small data transmission, wherein an access attempt of the UE is allowed based at least in part on a determination that data to be transmitted by the UE can be completely transmitted on the pre-configured UL resource, wherein whether the data can be completely transmitted on the pre-configured UL resource is based at least in part on the AC, and wherein the access attempt of the UE is allowed based at least in part on a determination that the data to be transmitted by the UE is not to be discarded, wherein whether the data is to be discarded is based at least in part on the data to be transmitted by the UE not being able to be completely transmitted on the pre-configured UL resource.

18. The method of claim 17, wherein the one or more barring information set entries comprise one or more of:

information regarding whether a first access attempt of the UE is allowed for each AI of the UE;

a probability of allowing the first access attempt of the UE during an access barring check; or a minimum time before a second access attempt of the UE is to be performed after the first access attempt of the UE is barred during an access barring check, wherein the second access attempt and the first access attempt are for a same AC.

19. The method of claim 18, wherein the probability of allowing the first access attempt of the UE is one hundred percent.

20. The method of claim 17, wherein the traffic is represented by one or more of a packet data unit (PDU) session, a data flow, a data radio bearer (DRB), a logical channel (LCH), or a quality of service (QoS) flow.

* * * * *